United States Patent
Gruhlke et al.

(10) Patent No.: US 6,934,437 B2
(45) Date of Patent: Aug. 23, 2005

(54) OPTICALLY-CONTROLLED SWITCH AND OPTICALLY-CONTROLLED OPTICAL SWITCHING METHOD USING DISPERSION CURVE SHIFTING

(75) Inventors: Russell Wayne Gruhlke, Fort Collins, CO (US); David Gines, Fort Collins, CO (US); Alfonso Benjamin Amparan, Fort Collins, CO (US)

(73) Assignee: Agilent Technologies, Inc, Palo Alto, CA (US)

( * ) Notice: Subject to any disclaimer, the term of this patent is extended or adjusted under 35 U.S.C. 154(b) by 213 days.

(21) Appl. No.: 10/313,358

(22) Filed: Dec. 6, 2002

(65) Prior Publication Data

US 2004/0109632 A1 Jun. 10, 2004

(51) Int. Cl.[7] ............................. G02B 6/35; G02B 6/34; G02F 1/295

(52) U.S. Cl. ................................ 385/16; 385/5; 385/37

(58) Field of Search .......................... 385/1–10, 14–24, 385/37, 45, 47; 359/562, 563, 566, 568–576

(56) References Cited

U.S. PATENT DOCUMENTS

| | | | | |
|---|---|---|---|---|
| 4,747,654 A | * | 5/1988 | Yi-Yan | 385/37 |
| 4,874,216 A | * | 10/1989 | Utaka et al. | 385/37 |
| 5,133,027 A | * | 7/1992 | Funazaki et al. | 385/5 |
| 5,937,115 A | * | 8/1999 | Domash | 385/16 |
| 6,760,492 B1 | * | 7/2004 | Lit et al. | 385/5 |

FOREIGN PATENT DOCUMENTS

| | | | | | |
|---|---|---|---|---|---|
| JP | 02069723 A | * | 3/1990 | | G02F/1/35 |
| JP | 02072331 A | * | 3/1990 | | G02F/1/35 |
| JP | 06027502 A | * | 2/1994 | | G02F/1/313 |

* cited by examiner

Primary Examiner—Michelle R. Connelly-Cushwa

(57) ABSTRACT

Optical switches and optical switching methods are provided. One such optical switch includes a waveguide located in a substrate that is at least partially of a non-linear optical material, the waveguide structured to receive an input optical signal, a grating located at least partially in the non-linear optical material, and a first output port optically aligned to a first radiative mode of the grating. The grating exhibits a first radiative mode corresponding to a first intensity of the input optical signal, and a second radiative mode corresponding to a second intensity of the input optical signal. The optical switch may further include a second output port optically aligned to the second radiative mode.

21 Claims, 8 Drawing Sheets

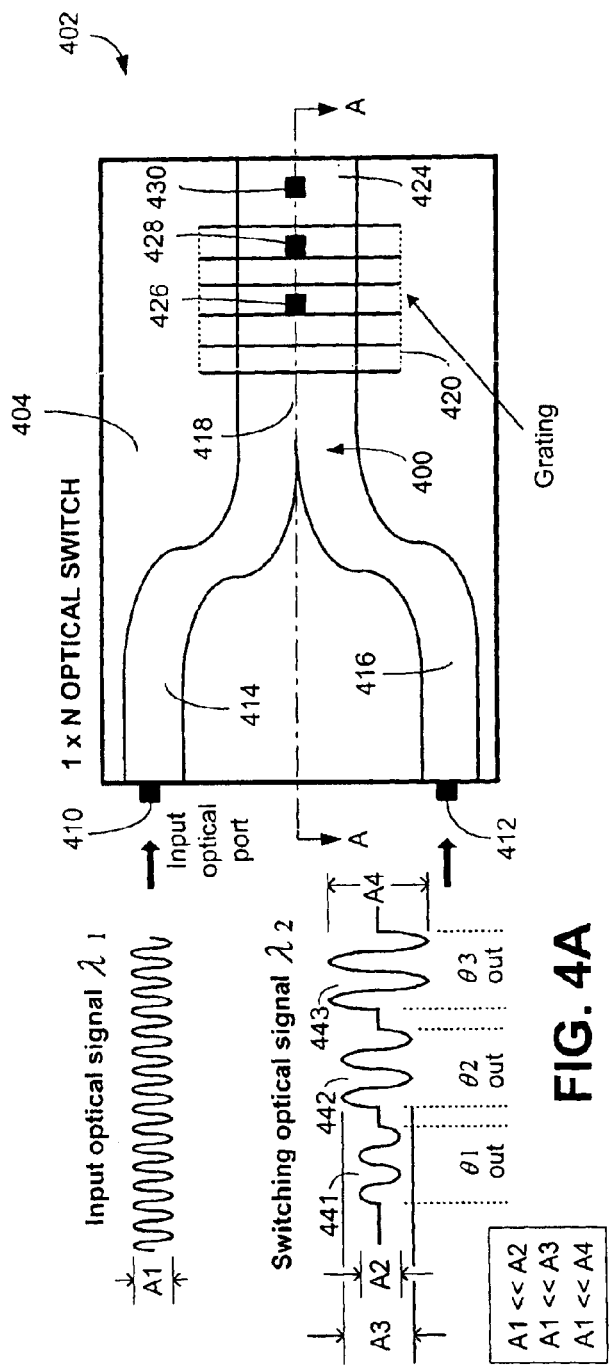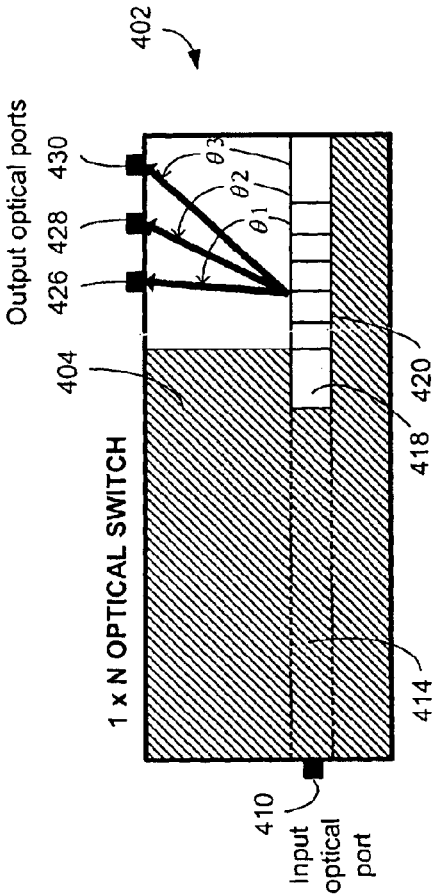

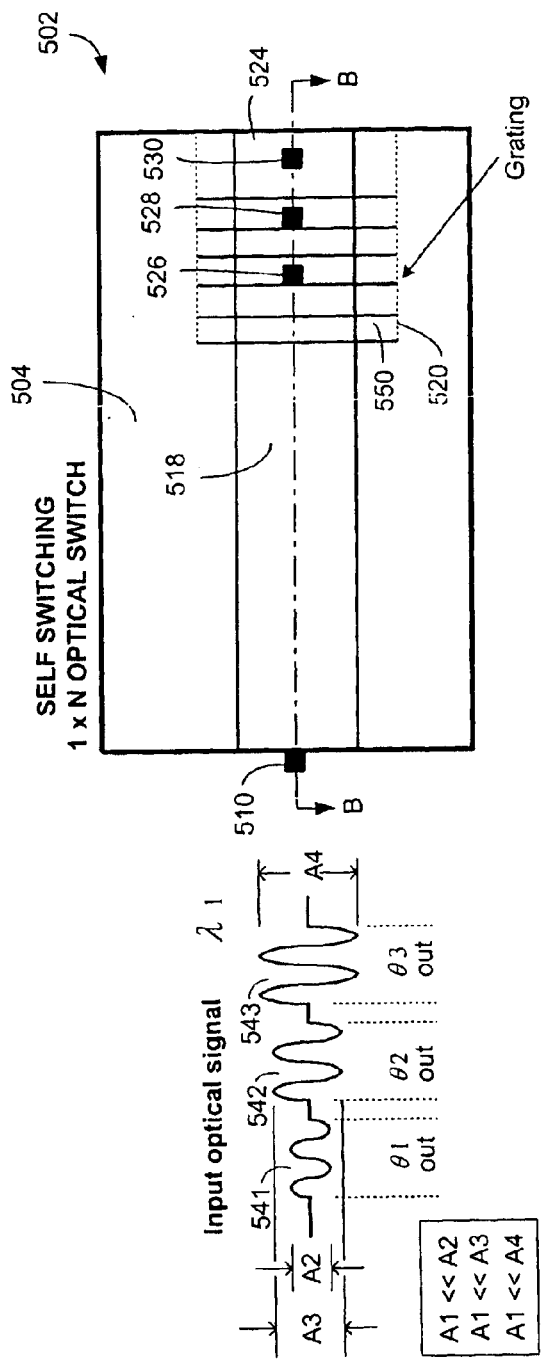
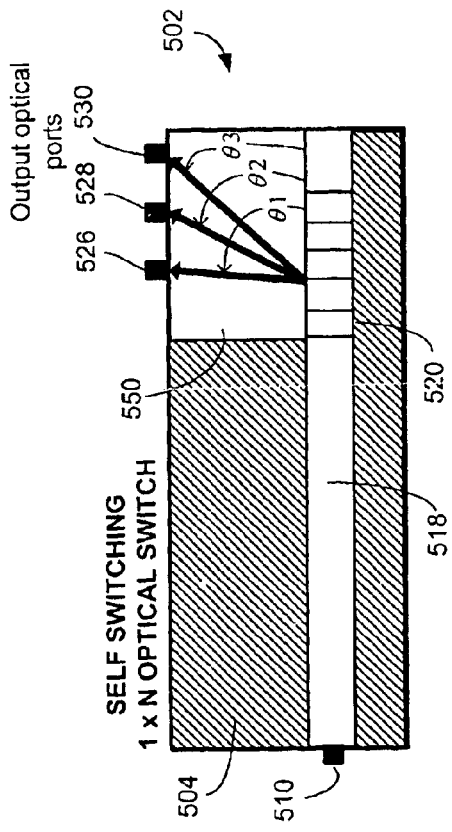
FIG. 5A
FIG. 5B

OPTICALLY-CONTROLLED SWITCH AND OPTICALLY-CONTROLLED OPTICAL SWITCHING METHOD USING DISPERSION CURVE SHIFTING

DESCRIPTION OF THE RELATED ART

Optical signal transmission systems typically incorporate optical switches to route optical signals selectively through alternative transmission paths. The desirable characteristics of an optical switch include fast switching speed, wide bandwidth, low power consumption, high mean-time-between-failures (MTBF), high signal-to-noise ratio, and low cost. Most optical switches place emphasis on switching speed as well as wide bandwidth.

An optical switch may be implemented in an all-optical manner, or may be implemented using electro-optic techniques. When fast switching is a priority, the all-optical solution is favored over the electro-optic solution because the electro-optic solution involves signal transformation between optical and electrical domains. This type of transformation leads to signal-propagation delays and can also introduce other shortcomings that are related to factors such as device-bandwidth limitations, signal-to-noise degradation, and power requirements for electronic devices.

Some optical switches trade fast switching speed for wide bandwidth. One solution that provides wide bandwidth at the expense of switching speed incorporates micro-mirrors that are typically classified as micro-electro-mechanical-systems (MEMS). These mirrors provide wide bandwidth when switching wide-band optical signals, but their switching functionality involves physically rotating the mirrors to route the light beams in specified directions. This physical rotation process has a slower switching speed than switching systems that incorporate switching elements with no moving parts. Furthermore, mechanically-moving switches generally provide less system reliability due to their low mean-time-between-failure (MTBF) rates in comparison to switches that utilize stationary switching elements.

The general structure of a switch, whether optical, electrical or mechanical, takes the form of a M×N matrix, where M refers to the number of input terminals, and N refers to the number of output terminals. A 1×1 switch is typically referred to as a single-pole-single-throw (SPST) switch, a 1×2 switch is called a single-pole-double-throw (SPDT) switch, and a 2×2 switch is called a double-pole-double-throw (DPDT) switch.

A 1×N switch is generically referred to as a single-pole-multi-throw switch. Such a switch is sometimes created by cascading several 1×2 switches. Each column of 1×2 switches is referred to as a stage. A multi-stage switch structure typically has a high cumulative signal insertion loss due to the insertion loss in each individual stage. For example, if a single SPDT switch causes 1 dB attenuation of a signal, an exemplary four-stage switching matrix using one such SPDT switch from each stage will lead to a 4 dB insertion loss. It is therefore preferable to replace this kind of multi-stage switch architecture by a single-stage switch architecture, rather than a cascaded structure made up of several individual switches.

An optically-controlled single-stage 1×N optical switch with no moving parts is highly desirable in optical switching systems because it addresses several shortcomings of existing switches. These shortcomings relate to factors such as MTBF, switching speed, bandwidth, insertion loss and signal-to-noise ratio.

SUMMARY OF THE INVENTION

The invention provides an optical switch that includes a waveguide located in a substrate comprised at least partially of a non-linear optical material, the waveguide structured to receive an input optical signal. The optical switch also includes a grating located at least partially in the non-linear optical material. The grating exhibits a first radiative mode at a first wavenumber corresponding to a first intensity of the input optical signal, and a second radiative mode at a second wavenumber corresponding to a second intensity of the input optical signal. The optical switch also includes a first optical output port aligned to the first radiative mode of the grating, and may additionally include a second optical output port aligned to the second radiative mode of the grating.

An embodiment of the optical switch additionally includes a source of a switching optical signal arranged to illuminate the grating. The switching optical signal can be guided to the grating via the waveguide, or via a path external to the waveguide.

In this embodiment, the grating exhibits the first radiative mode at a first wavenumber corresponding to a first intensity of the switching optical signal, and the second radiative mode at a second wavenumber corresponding to a second intensity of the switching optical signal.

The invention also provides an optical switching method that includes providing a grating located at least partially in non-linear optical material and directing towards the grating one of (a) both an input optical signal and a switching optical signal, and (b) an input optical signal. When both optical signals are directed towards the grating, the switching optical signal is set to a first intensity thereof to diffract the input optical signal in a first radiative mode. Otherwise, when only the input optical signal is directed towards the grating, the input optical signal is set to a first intensity thereof to diffract the input optical signal in the first radiative mode. The input optical signal diffracted in the first radiative mode is received in a direction aligned to the first radiative mode.

The optical switching method may additionally include, when both optical signals are directed towards the grating, setting the switching optical signal to a second intensity thereof to diffract the input optical signal in a second radiative mode. Otherwise, when only the input optical signal is directed towards the grating, the input optical signal is set to a second intensity thereof to diffract the input optical signal in the second radiative mode. The optical switching method may additionally include receiving the input optical signal diffracted in the second radiative mode in a direction aligned to the second radiative mode.

Clearly, some embodiments of the invention may exhibit advantages in addition to, or in lieu of, those mentioned above. Additionally, other switching systems, methods, features and/or advantages of the present invention may become apparent. It is intended that all such additional systems, methods, features and/or advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale: emphasis is placed instead on clearly illustrating the invention. Moreover, in the drawings, like reference numerals designate corresponding parts throughout the several views.

FIG. 4A is a plan view of an exemplary 1×N optical switch constructed in accordance with the present invention.

FIG. 4B is a cross-sectional view of the optical switch of FIG. 4A along the section line A—A.

FIG. 5A is a plan view of an exemplary 1×N optical switch constructed to operate as a self-switching optical switch in accordance with the present invention.

FIG. 5B is a cross-sectional view of the self-switching optical switch of FIG. 5A along the section line B—B.

DETAILED DESCRIPTION

The present invention involves the use of a waveguide located at least partially in a non-linear optical material. The optical properties of non-linear materials are dependent on the intensity of the light incident on the non-linear material. In particular, the refractive index of the non-linear optical material depends on the intensity of the incident light, where intensity is defined as optical power per area or in an alternative expression, as optical energy per time per area. Optical power per area may for example, be expressed in terms of watts/square millimeter. An optical waveguide containing non-linear optical material has properties that are likewise dependent upon the intensity of light either incident the waveguide or propagating in the waveguide. As used herein, the term light encompasses electromagnetic radiation in a wavelength range from far infra-red through X-rays.

The waveguide incorporates a grating located in the non-linear optical material. The grating has a pitch such that interaction with a radiative mode occurs at a certain wavelength or photonic energy level of an input optical signal. The radiative mode created in the grating angularly diffracts the input optical signal away from the longitudinal axis along which the signal propagates. The diffraction angle can be controlled by varying refractive index of the non-linear optical material in response to the intensity of the input optical signal, and this control property is incorporated into one embodiment of the invention—an optical switch that may be referred to as a self-switching optical switch.

Alternatively, the diffraction angle can be controlled by varying the refractive index of the non-linear optical material in response to the intensity of a secondary optical signal that may be introduced into the grating via direct external illumination or along with the input optical signal through the waveguide. This secondary optical signal is referred to herein as a switching optical signal. A second embodiment of the invention—an optical switch, utilizes such a switching optical signal to control the diffraction angle of an input optical signal.

Figure 1:
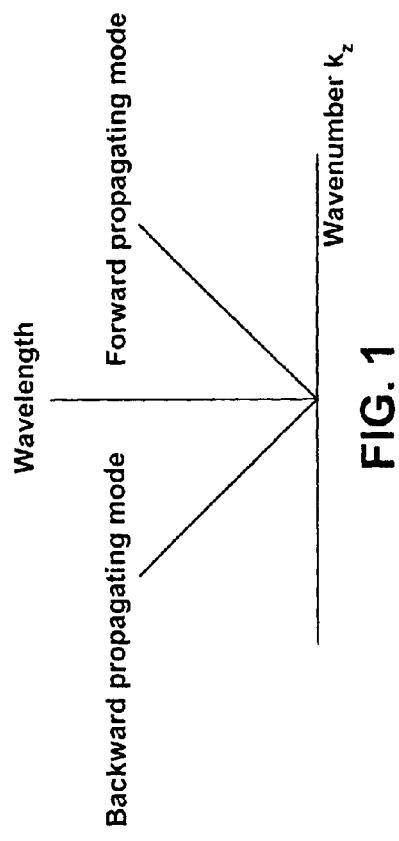
FIG. 1 illustrates a dispersion curve diagram that plots the possible photonic states for light propagating through an optical waveguide, plotted as wavelength versus wavenumber $k_z$.

FIG. 1 illustrates a dispersion curve diagram that plots the photonic states for light propagating through an optical waveguide, plotted as wavelength versus wavenumber $k_z$. The two modes of propagation shown are the forward and the backward propagation modes. A waveguide "mode" is used to describe the optical field pattern, or energy flow, created by an optical signal as it travels down an optical waveguide. The forward propagating mode refers to the pattern associated with that part of an optical signal traveling through the waveguide in one direction, while the backward propagating mode refers to the pattern associated with another part (possibly a reflected light signal) of the optical signal traveling through the waveguide in the opposite direction.

The slopes of the graphs related to these two modes are dependent upon the refractive index of the material in which the optical waveguide is fabricated, and the slopes may be modified by changing the refractive index.

Certain types of non-linear optical material exhibit a refractive index that depends on the intensity of the light incident upon such material. A generalized equation for refractive index 'n' is $n=n_0+n_1 I+ \ldots$ (higher order terms). In this equation, the $n_0$ term is dependent only upon the wavelength of the incident light. For example, when glass is described as having a refractive index of 1.5, the parameter implicit in this number is the wavelength at which the refractive index was measured, for example, 600 nm.

Defining the refractive index of non-linear optical material is more complicated because the refractive index is dependent not only on wavelength, but also on the intensity of the incident light. The $n_1 I$ term takes into account the dependence of 'n' on the intensity I. Note that 'n' can be a positive number or a negative number so that the refractive index can increase or decrease. Consequently, the refractive index of a non-linear optical material can be varied by changing the intensity of the incident light. This facilitates changing the propagating modes through the waveguide.

Figure 2:
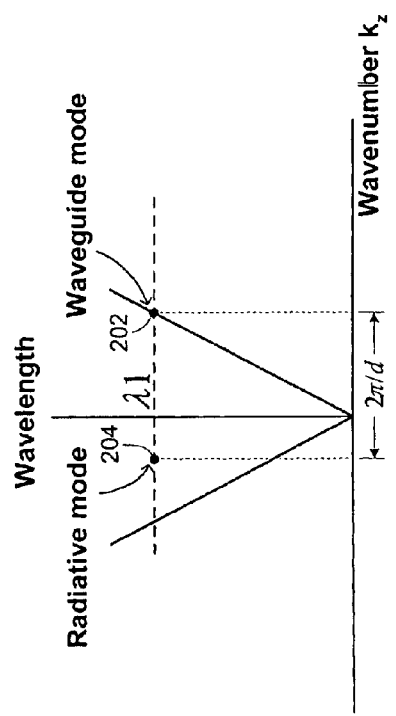
FIG. 2 illustrates the forward propagating waveguide mode interacting with a radiative mode of a waveguide that incorporates a grating located in a non-linear optical material.

FIG. 2 illustrates a single forward propagating waveguide mode interacting with a radiative mode in a waveguide that incorporates a grating located in non-linear optical material. The grating with period equal to "d" is formed, for example, by doping an area of the substrate of non-linear optical material to form a periodic structure. A planar waveguide (PWG) is then fabricated in the substrate to intersect the grating. Other ways of fabricating a grating in the non-linear material are possible. For example, the grating may be formed as corrugations in the substrate surface by using a photo-lithographic or other process.

A waveguide mode 202 supported in such a PWG can interact with a radiative mode 204 that exists at a wavenumber $k_z$ located ($2\pi/d$) away from the waveguide mode 202. The two modes 202 and 204 as shown are created by an input optical signal of wavelength $\lambda 1$.

Figure 3:
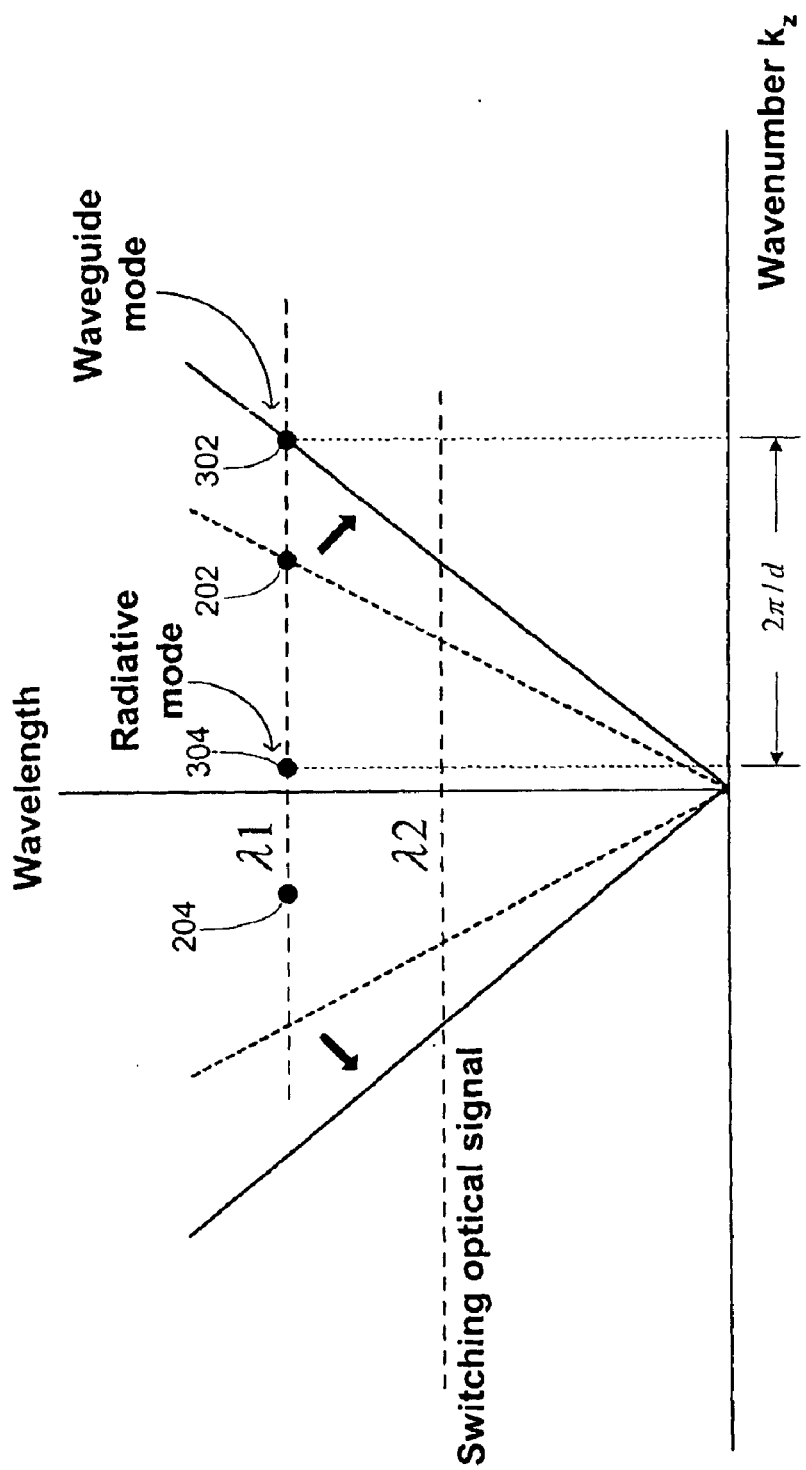
FIG. 3 illustrates a dispersion curve shift leading to a shift in the waveguide mode and a corresponding shift in the radiative mode, in the grating of FIG. 2.

FIG. 3 shows the waveguide mode 202 and the radiative mode 204 together with the associated dispersion curve that corresponds to the input optical signal of wavelength λ1 in a waveguide containing a grating located in a non-linear optical material. A dispersion curve that corresponds to a switching optical signal of wavelength λ2 is also indicated in FIG. 3.

Because the refractive index of the non-linear material of the grating is modified by adjusting the intensity of the input optical signal, the slope of the forward propagating mode and the slope of the backward propagating mode are changed by varying the intensity of either the input optical signal or the switching optical signal. The nominal intensity of the switching optical signal of wavelength λ2 is selected to be larger than the intensity of the input optical signal of wavelength λ1. This causes the switching optical signal to have a larger effect on the slope of the dispersion curve than the input optical signal.

When the intensity of the switching optical signal of wavelength λ2 is changed, the change in slope of the dispersion curve causes the initially existing waveguide mode 202 to shift along the $k_z$ axis and form a new waveguide mode 302. Since the physical grating period "d" is constant, and the spacing between the waveguide mode and the radiative mode is a constant, the initial radiative mode 204 also shifts to a new radiative mode 304 which is (2π/d) away from the new waveguide mode 302.

FIG. 4A is a plan view of an exemplary 1×N optical switch 402 constructed in accordance with the present invention, while FIG. 4B provides a cross-sectional view A—A of the optical switch 402 of FIG. 4A. Specifically, the 1×N optical switch 402 is shown with a value of N=3, i.e., as a 1×3 optical switch with an optical input port 410 and three optical output ports 426, 428, and 430. Input port 410 is connected to a first input waveguide section 414 that is part of the planar waveguide 400 fabricated in a planar lightwave circuit (PLC) substrate 404. PLC substrate 404 is formed at least partially of a non-linear optical material. The input port 410 may be implemented in several ways. For example, input port 410 may be implemented in the form of an optical coupling connector that is optically aligned to the waveguide section 414. Typically, an input optical signal of wavelength λ1 will be provided as an incident input optical signal into input port 410 using this connector. An additional optical input port 412, which may also be implemented as an optical coupling connector, is connected to a second input waveguide section 416 that is also a part of the waveguide 400. Waveguide section 414 and waveguide section 416 combine, typically in a y-formation, in the substrate 404 to form waveguide section 418 that is also a part of waveguide 400. Waveguide section 418 passes through the grating 420. The grating 420 has been fabricated in the non-linear optical material of substrate 404.

The three output ports 426, 428, and 430 are shown as exemplary output ports for the optical switch 402. The location of each of these three output ports corresponds to one of three radiative modes. For example, if the grating diffracts an input optical signal at an angle θ1 in the first radiative mode, the first output port 426 is located to receive the input optical signal diffracted at this particular angle. Under this condition, the diffracted optical signal will not appear at either port 428 or at port 430.

In a second radiative mode, the grating diffracts the input optical signal at a second angle, θ2. The second output port 428 is located to receive the input optical signal diffracted at this angle θ2. The diffracted optical signal will not appear at either port 426 or port 430 in this second radiative mode. In a third radiative mode, the grating diffracts the input optical signal at a third angle, θ3. The third output port 430 is located to receive the input optical signal diffracted at this angle θ3. The diffracted optical signal will not appear at either port 426 or port 428 in this third radiative mode.

An output port may be implemented as an optical coupling connector. It may also be implemented as a fiber-optic pigtail, or as an optical detector that is mounted on the substrate 404 in optical alignment to a selected radiative mode.

A switching optical signal of wavelength λ2 is provided to the second input port 412 of optical switch 402. The switching optical signal propagates through waveguide section 416, while the input optical signal propagates through waveguide section 414. Subsequently, the two signals propagate through waveguide section 418. Grating 420 that is located in waveguide section 418 diffracts the input optical signal in accordance with the radiative mode created by the intensity of the switching optical signal. The switching action of the optical switch 402 depends on the intensity of the switching optical signal of wavelength λ2. This intensity determines the refractive index of the non-linear optical material in which grating 420 has been fabricated, and produces a corresponding radiative mode in the input optical signal of wavelength λ1.

The input optical signal is shown as a continuous wave (CW) signal in this example, but it is not constrained to be a CW signal in other applications. The switching optical signal is shown in this example with three intensity levels that are used for switching the input optical signal towards the three output ports 426, 428, and 430, respectively, of the optical switch 402. In other applications, the number of intensity levels is selected to correspond to a different number of output ports.

As a first example of operation of the optical switch 402, when the switching optical signal is set to an intensity A2 (waveform 441), the radiative mode corresponds to an angle of diffraction θ1. After the input optical signal propagates from input port 410 through waveguide section 414 and waveguide section 418, the radiative mode causes the input optical signal to be diffracted to output port 426.

As a second example of operation of the optical switch 402, when the switching optical signal is set to an intensity A3 (waveform 442), the radiative mode corresponds to an angle of diffraction θ2. After the input optical signal propagates from input port 410 through waveguide section 414 and waveguide section 418, this radiative mode causes the input optical signal to be diffracted to output port 428.

As a third example of operation of the optical switch 402, when the switching optical signal is set to an intensity A4 (waveform 443), the radiative mode corresponds to an angle of diffraction θ3. After the input optical signal propagates from input port 410 through waveguide section 414 and waveguide section 418, this radiative mode causes the input optical signal to be diffracted to output port 430.

Figure 4C:
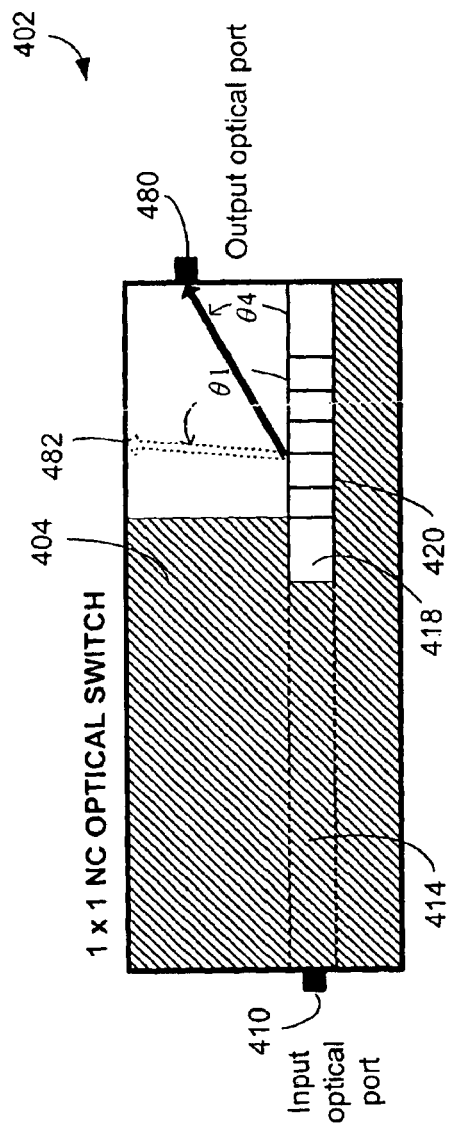
FIG. 4C is a cross-sectional view of the optical switch of FIG. 4A along the section line A—A, when constructed to operate as a 1×1 NC optical switch.

FIG. 4C is a cross-sectional view of the optical switch of FIG. 4A along the section line A—A, when constructed to operate as a 1×1 NC optical switch. In FIG. 4C, the three output ports 426, 428, and 430 of FIGS. 4A and 4B have been eliminated. This embodiment of the optical switch 402 operates as a 1×1 NC switch (N=1) and incorporates single output port 480. The NC operation is implemented by setting the intensity of the switching optical signal to zero. This setting of intensity constitutes a "default intensity." The input optical signal propagates through waveguide 418 to grating 420. With this setting of the intensity, the grating diffracts the input optical signal towards output port 480 ("normally closed" switch position).

When the switching optical signal intensity is subsequently changed to an "active" value, for example A2 (waveform 441 of FIG. 4A), the grating diffracts the input optical signal at an angle θ1. This diffraction directs the input optical signal towards location 482. Location 482 is not associated with an output port, and consequently the diffracted input optical signal is not received by any output port of the optical switch 402.

It will also be understood that setting the "default intensity" to zero is equivalent to the absence of the switching optical signal. Intensities of zero and A2 mentioned here are merely examples. In other applications, the intensities may be set to other suitable values, and output port 480 may be suitably located aligned with the optical path of diffracted input optical signal at the default intensity of the switching optical signal.

Figure 4D:
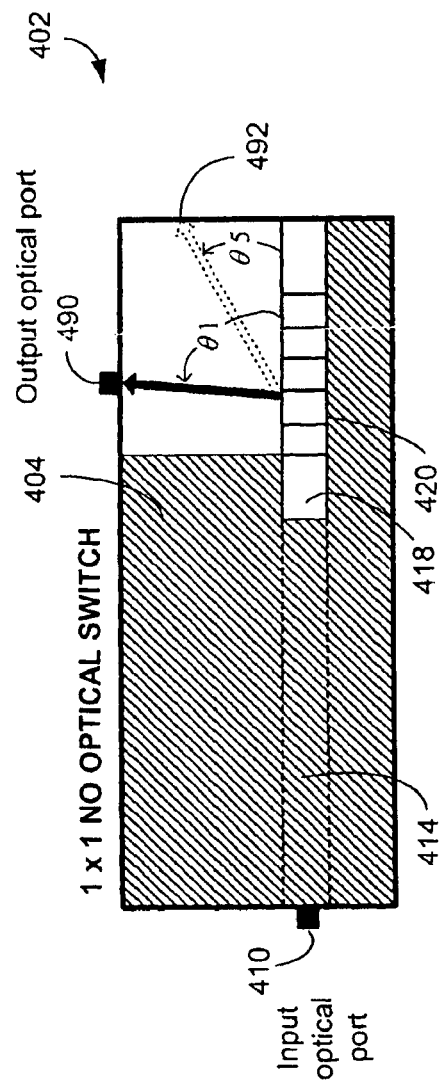
FIG. 4D is a cross-sectional view of the optical switch of FIG. 4A along the section line A—A, when constructed to operate as a 1×1 NO optical switch.

FIG. 4D is a cross-sectional view of the optical switch of FIG. 4A along the section line A—A, when constructed to operate as a 1×1 NO optical switch. In FIG. 4D, the three output ports 426, 428, and 430 of FIGS. 4A and 4B have been eliminated. This embodiment of the optical switch 402 operates as a 1×1 NO switch (N=1) and incorporates a single output port 490. The NO operation is implemented by setting the intensity of the switching optical signal to zero. This intensity constitutes a "default intensity." The input optical signal propagates through waveguide 418 to grating 420. With this setting of the intensity, the grating diffracts the input optical signal through diffraction angle θ5 towards location 492. No output port is located at location 492. Consequently, the optical signal is not received by any output port of the optical switch 402. Under this condition, where the intensity of the switching optical signal is zero (absent), the input optical signal does not appear at output port 490, thereby causing optical switch 402 to operate as a "normally-open" switch.

When the switching optical signal intensity is subsequently changed to an "active" value, for example A2 (waveform 441 of FIG. 4A), grating 420 diffracts the input optical signal at an angle θ1. This directs the input optical signal towards output port 490, which transmits the input optical signal out of the optical switch.

It will also be understood that setting the "default intensity" to an intensity level zero is equivalent to the absence of the switching optical signal. Intensities of zero and A2 mentioned here are merely examples. In other applications, the intensities of the switching optical signal may be set to other suitable values, and output port 490 may be suitably located aligned with the optical path of the diffracted input optical signal.

FIG. 5A is a plan view of an exemplary 1×N optical switch constructed to operate as a self-switching optical switch in accordance with the present invention, while FIG. 5B is a cross-sectional view of the self-switching optical switch of FIG. 5A along the section line B—B. Specifically, the 1×N optical switch 502 is shown with a value of N=3, i.e., as a 1×3 optical switch with an optical input port 510 and three optical output ports 526, 528, and 530. Input port 510 is connected to a waveguide 518, which has been fabricated upon a PLC substrate 504 formed at least partially of a non-linear optical material. The input port 510 may be implemented in several ways. For example, input port 510 may be implemented in the form of an optical coupling connector that is optically aligned to the waveguide 518. Waveguide 518 passes through the grating 520 that has been fabricated upon the substrate 504.

The three output ports 526, 528, and 530 are shown as exemplary output ports for the optical switch 502. The location of each of these three output ports corresponds to one of three radiative modes. For example, if the input optical signal is diffracted by an angle θ1 in the first radiative mode, the first output port 526 is located to receive the input optical signal diffracted at this particular angle. Under this condition, the diffracted input optical signal will not appear at either port 528 or at port 530.

The input optical signal is diffracted by a second angle θ2 in the second radiative mode. The second output port 528 is located to receive the input optical signal diffracted at this angle θ2. The diffracted input optical signal will not appear at either port 526 or port 530 in this second radiative mode. In a third radiative mode, the input optical signal is diffracted at a third angle, θ3. The third output port 530 is located to receive the input optical signal diffracted at this angle θ3. The diffracted input optical signal will not appear at either port 526 or port 528 in the third radiative mode.

An output port may be implemented as an optical coupling connector. It may also be implemented as a fiber-optic pigtail or as an optical detector that is mounted on the substrate 504 in optical alignment to a selected radiative mode. An input optical signal of wavelength λ1 is provided to the input port 510 of optical switch 502. The switching action of optical switch 502 depends upon the intensity of the input optical signal, as this intensity determines the refractive index of the non-linear optical material in which grating 520 is located.

In this example, three intensity levels of the input optical signal are shown. In each of these, the input optical signal is diffracted towards a different one of the three output ports 526, 528, and 530 of the optical switch 502. In other applications, the number of intensity levels may be selected to correspond to various other values of N, where N designates the number of output ports.

As a first example of operation of the optical switch 502, when the input optical signal is set to an intensity A2 (waveform 541), the radiative mode corresponds to an angle of diffraction θ1. After the input optical signal propagates from input port 510 through waveguide 518 to grating 520, the grating diffracts the input optical signal in this radiative mode towards output port 526.

As a second example of operation of the optical switch 502, when the input optical signal is set to an intensity A3 (waveform 542), the radiative mode corresponds to an angle of diffraction θ2. After the input optical signal propagates from input port 510 through waveguide 518 to grating 520, the grating diffracts the input optical signal in this radiative mode towards output port 528.

As a third example of operation of the optical switch 502, when the input optical signal is set to an intensity A4 (waveform 543), the radiative mode corresponds to an angle of diffraction θ3. After the input optical signal propagates from input port 510 through waveguide 518 to grating 520, the grating diffracts the input optical signal in this optical mode towards output port 530.

Figure 5C:
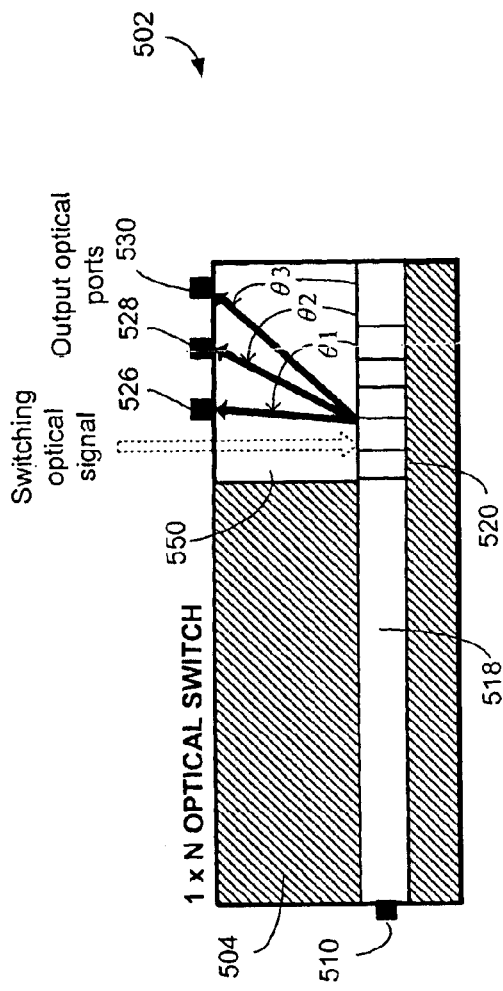
FIG. 5C is a cross-sectional view of the optical switch of FIG. 5A along the section line B—B, when constructed to receive a switching optical signal.

FIG. 5C is a cross-sectional view of an embodiment of the optical switch of FIG. 5A along the section line B—B. This embodiment is constructed additionally to receive a switching optical signal. In this exemplary embodiment, the switching optical signal is projected directly onto the grating 520 via the top surface region 550. Region 550 is fabricated from suitably transparent material, such as glass, to allow the switching optical signal to propagate through it and illuminate the grating 520. This embodiment, unlike the embodiment described with reference to FIG. 4A, does not utilize an input port and a waveguide section to guide the switching optical signal to the grating 520.

Figure 5D:
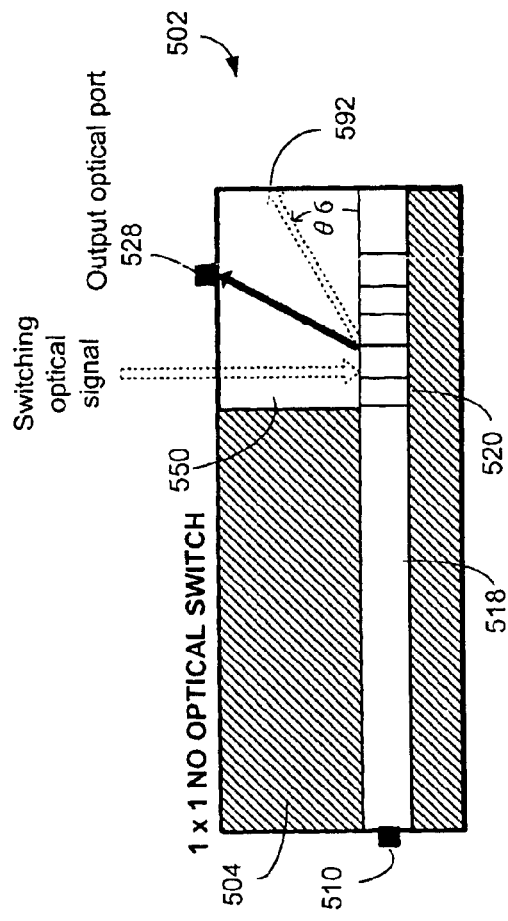
FIG. 5D is a cross-sectional view of the optical switch of FIG. 5A along the section line B—B, when constructed to receive a switching optical signal and to operate as a 1×1 NO optical switch.

FIG. 5D is a cross-sectional view of an embodiment of the optical switch 502 of FIG. 5A along the section line B—B. This embodiment is constructed additionally to receive a switching optical signal and to operate as a 1×1 NO optical switch. In FIG. 5D, two of the three output ports 526, 528, and 530 of FIGS. 5A and 5B have been eliminated. This embodiment of the optical switch 502 operates as a 1×1 NO switch (N=1) and incorporates output port 528. The NO operation is implemented by setting the intensity of the switching optical signal to zero. Such intensity constitutes a "default intensity" in this example. The input optical signal propagates through waveguide 518 to grating 520. At this intensity of the switching optical signal, the grating diffracts the input optical signal at diffraction angle θ6 towards location 592. Location 592 is not associated with an output port, and consequently the optical signal that appears at this location is not received by any output port of the optical switch 502. Under this condition, where the intensity of the switching optical signal is zero (absent), the input optical signal does not appear at output port 528, thereby causing optical switch 502 to operate as a "normally-open" switch.

When the switching optical signal intensity is subsequently changed to a suitable "active" value, switching optical signal causes grating 520 to diffract the input optical signal towards output port 528, which transmits the input optical signal out of the optical switch 502. The optical switch 502 may alternatively be configured to operate as a 1×1 NC switch in response to an external switching signal in a manner similar to that described above with reference to FIG. 4C.

Figure 6A:
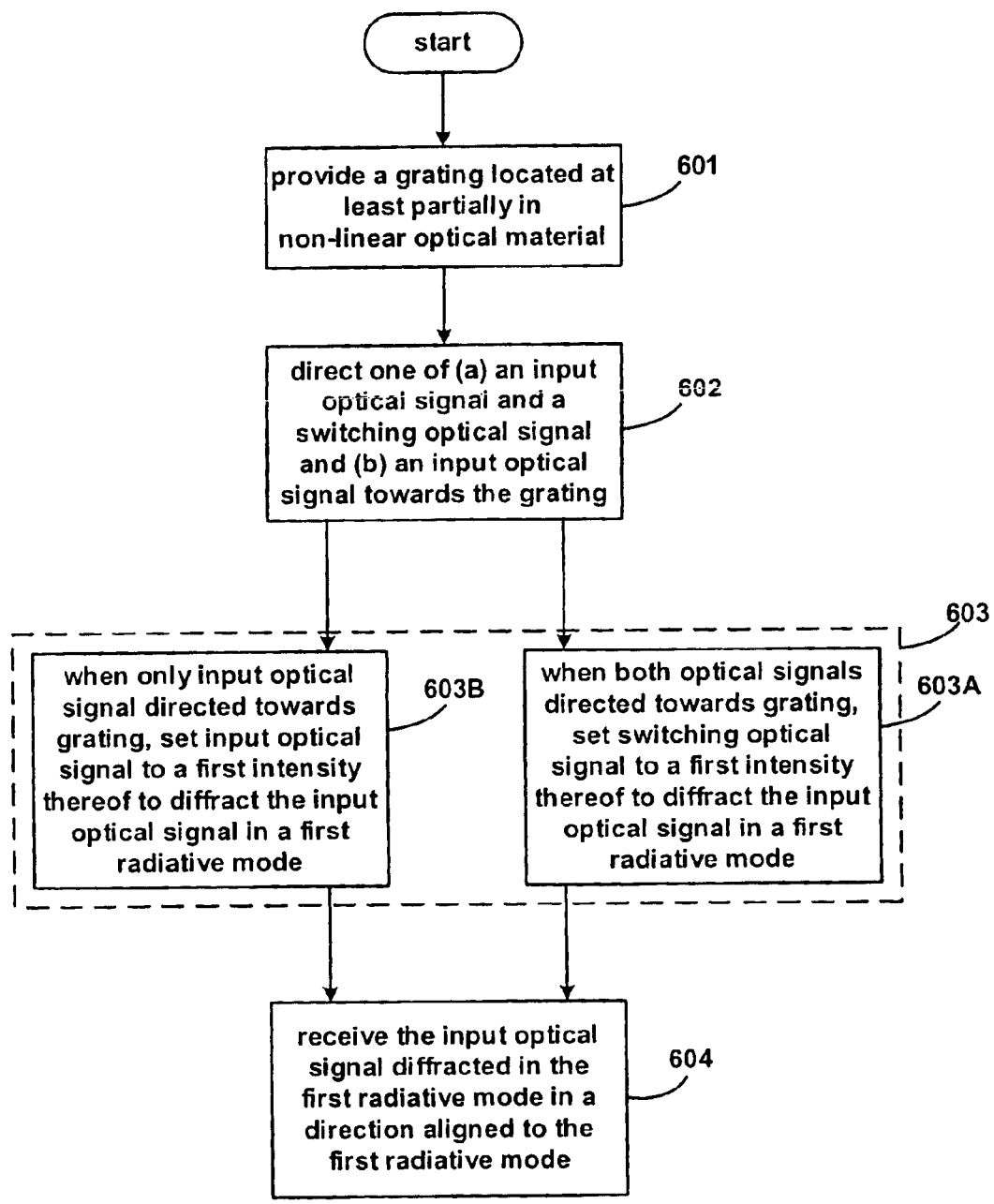
FIG. 6A is a flow chart that shows a first embodiment of an optical switching method in accordance with the invention.

FIG. 6A is a flow chart that shows a first embodiment of an optical switching method in accordance with the invention. The method can be used to switch an input optical signal by varying the intensity of a switching optical signal. Alternatively, the method can be used to self-switch an input optical signal by varying the intensity of the input optical signal itself. It will be understood that the various blocks of the flow charts are shown in one specific sequence merely as an example, and the order of implementation of these blocks may be modified in other applications.

In block 601, a grating located at least partially in a non-linear optical material is provided.

In block 602, one of (a) both an input optical signal and a switching optical signal and (b) an input optical signal only is directed towards the grating.

In block 603, when both optical signals are directed towards the grating, the switching optical signal is set to a first intensity thereof to diffract the input optical signal in a first radiative mode, as indicated in block 603A. Otherwise, when only the input optical signal is directed towards the grating, the input optical signal is set to a first intensity thereof to diffract the input optical signal in a first radiative mode, as indicated in block 603B.

In block 604, the input optical signal diffracted in the first radiative mode is received.

In an embodiment of the method in which the input optical signal is switched by varying the intensity of a switching optical signal, both the input optical signal and the switching optical signal are directed towards the grating in block 602, the switching optical signal is set to a first intensity thereof to diffract the input optical signal in a first radiative mode in block 603A and the input optical signal directed in the first radiative mode is received in block 604.

In an embodiment of the method in which the input optical signal is switched by varying the intensity of the input optical signal itself, only the input optical signal is directed towards the grating in block 602, the input optical signal is set to a first intensity thereof to diffract the input optical signal in a first radiative mode in block 603B and the input optical signal diffracted in the first radiative mode is received in block 604.

In block 602, when both optical signals are directed towards the grating, the input optical signal may be directed towards the grating in a first direction and the switching optical signal may be directed towards the grating in a second direction, different from the first direction.

In block 603, when both optical signals are directed towards the grating, the first intensity of the switching optical signal may be set as a default intensity thereof. Otherwise, when only the input optical signal is directed towards the grating, the first intensity of the input optical signal may be set as a default intensity thereof.

Figure 6B:
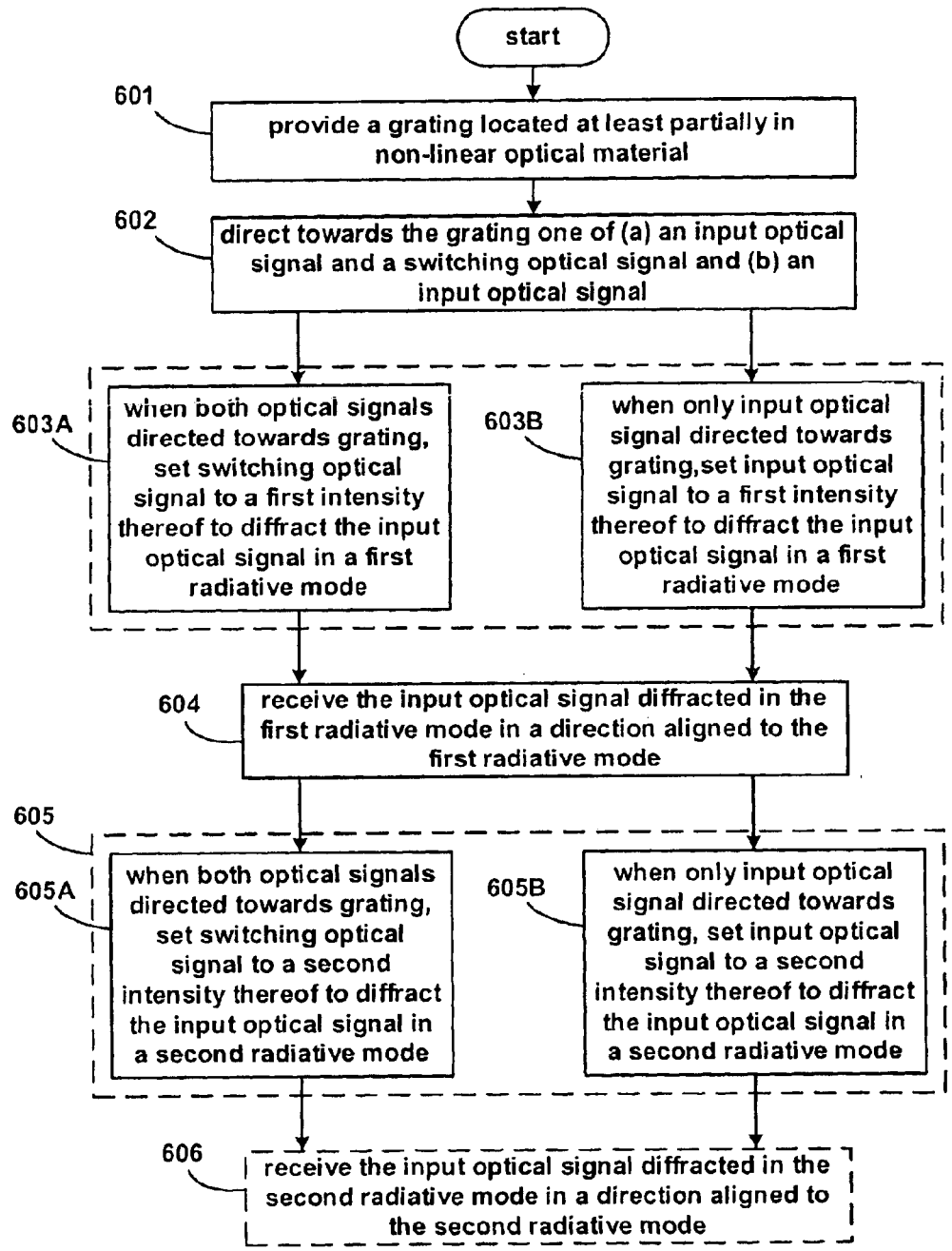
FIG. 6B is a flow chart that shows a second embodiment of an optical switching method in accordance with the invention.

FIG. 6B is a flow chart that shows a second embodiment of an optical switching method in accordance with the invention. Again, the method can be used for switching an input optical signal by varying the intensity of a switching optical signal or for self-switching an input optical signal by varying the intensity of the input optical signal itself. Elements of the embodiment shown in FIG. 6B that correspond to elements of the embodiment shown in FIG. 6A are indicated using the same reference numerals and will not be described again here.

In block 605, when both optical signals are directed towards the grating, the switching optical signal is set to a second intensity thereof that diffracts the input optical signal in a second radiative mode, as indicated in block 605A. Otherwise, when only the input optical signal is directed towards the grating, the input optical signal is set to a second intensity thereof to diffract the input optical signal in a second radiative mode, as indicated in block 605B.

In an embodiment of the method in which the input optical signal is switched by varying the intensity of a switching optical signal, both the input optical signal and the switching optical signal are directed towards the grating in block 602, the switching optical signal is set to a first intensity thereof to diffract the input optical signal in a first radiative mode in block 603A, the input optical signal diffracted in the first radiative mode is received in block 604 and the switching optical signal is set to a second intensity thereof to diffract the input optical signal in a second radiative mode in block 605A. In an embodiment of the method in which the input optical signal is switched by varying the intensity of the input optical signal itself, only the input optical signal is directed towards the grating in block 602, the input optical signal is set to a first intensity thereof to diffract the input optical signal in a first radiative mode in block 603B, the input optical signal diffracted in the first radiative mode is received in block 604 and the input optical signal is set to a second intensity thereof to diffract the input optical signal in a second radiative mode in block 605B.

In block 602, when both optical signals are directed towards the grating, the input optical signal may be directed towards the grating in a first direction and the switching optical signal may be directed towards the grating in a second direction, different from the first direction.

When both optical signals are directed towards the grating, the first intensity of the switching optical signal may be set in block 603 as a default intensity thereof or the second intensity of the switching optical signal may be set in block 605 as the default intensity thereof. Otherwise, when only the input optical signal is directed towards the grating, the first intensity of the input optical signal may be set in block 603 as a default intensity thereof or the second intensity of the input optical signal may be set in block 605 as the default intensity thereof.

The embodiment of the method shown in FIG. 6B may additionally include optional block 606. In block 606, the input optical signal diffracted in the second radiative mode is received. When the process of block 606 is performed, the method provides two-way switching of the input optical signal. When the process of block 606 is not performed, the method provides one-way switching of the input optical signal. The one-way switching may be normally-closed (NC) switching or normally-open (NO) switching. When both the input optical signal and the switching optical signal are directed towards the grating, the method provides normally-closed switching when the first intensity of the switching optical signal is set as the default intensity thereof, whereas the method provides normally-open switching when the second intensity of the switching optical signal is set as the default intensity thereof. When only the input optical signal is directed towards the grating, the method provides normally-closed switching when the first intensity of the input optical signal is set as the default intensity thereof, whereas the method provides normally-open switching when the second intensity of the input optical signal is set as the default intensity thereof.

The above-described embodiments of the present invention are merely set forth for a clear understanding of the principles of the invention. Many variations and modifications may be made without departing substantially from the invention. All such modifications and variations are included herein within the scope of this disclosure and the present invention and are protected by the following claims.

What is claimed is:

1. An optical switch, comprising:
    a waveguide located in a substrate at least partially of a non-linear optical material, the waveguide structured to receive an input optical signal; and
    a grating located at least partially in the non-linear optical material, the grating being operative to exhibit a first radiative mode at a first wavenumber corresponding to a first intensity of the input optical signal incident on the grating, and a second radiative mode at a second wavenumber corresponding to a second intensity of the input optical signal incident on the grating, wherein the first and second radiative modes comprise at least one of an angular diffraction of the input optical signal away from the longitudinal axis along which the signal propagates.

2. The optical switch of claim 1, additionally comprising a source of a switching optical signal arranged to illuminate the grating.

3. The optical switch of claim 2, wherein the grating has a period "d," and the waveguide produces a first waveguide mode separated from the first radiative mode by a wavenumber ($k_z$) equal to ($2\pi/d$).

4. The optical switch of claim 3, wherein the grating is operative to exhibit the first radiative mode at a first wavenumber corresponding to a first intensity of the switching optical signal illuminating the grating, and a second radiative mode at a second wavenumber corresponding to a second intensity of the switching optical signal illuminating the grating.

5. The optical switch of claim 4, further comprising a first output port optically aligned to the first radiative mode of the grating.

6. The optical switch of claim 5, further comprising a second output port optically aligned to the second radiative mode of the grating.

7. The optical switch of claim 2, wherein the waveguide is structured to receive the switching optical signal and to guide the switching optical signal to illuminate the grating.

8. The optical switch of claim 2, wherein the switching optical signal illuminates the grating via an optical path external to the waveguide.

9. The optical switch of claim 1, additionally comprising a first output port optically aligned to the first radiative mode of the grating.

10. The optical switch of claim 9, further comprising a second output port optically aligned to the second radiative mode of the grating.

11. An optical switching method, comprising:
    providing a grating located at least partially in non-linear optical material;
    directing towards the grating an input optical signal and a switching optical signal;
    setting the switching optical signal to a first intensity thereof to diffract the input optical signal in a first radiative mode; and
    setting the switching optical signal to a second intensity thereof to diffract the input optical signal in a second radiative mode, wherein the first and second radiative modes comprise at least one of an angular diffraction of the input optical signal away from the longitudinal axis along which the signal propagates.

12. The method of claim 11, further comprising, when both optical signals are directed towards the grating, setting the first intensity thereof as a default intensity thereof.

13. The method of claim 11, further comprising, when both optical signals are directed towards the grating, setting the second intensity of the switching optical signal as a default intensity thereof.

14. The method of claim 11, wherein directing both an input optical signal and a switching optical signal towards the grating includes directing the switching optical signal towards the grating in a first direction and directing the input optical signal towards the grating in a second direction, different from the first direction.

15. The method of claim 11, additionally comprising receiving the input optical signal diffracted in the first radiative mode in a direction aligned to the first radiative mode.

16. The method of claim 15, further comprising receiving the input optical signal diffracted in the second radiative mode in a direction aligned to the second radiative mode.

17. An optical switching method, comprising:
    providing a grating located at least partially in non-linear optical material;
    directing towards the grating an input optical signal;
    setting the input optical signal to a first intensity thereof to diffract the input optical signal in a first radiative mode; and
    setting the input optical signal to a second intensity thereof to diffract the input optical signal in a second radiative mode, wherein the first and second radiative modes comprise at least one of an angular diffraction of the input optical signal away from the longitudinal axis along which the signal propagates.

18. The method of claim 17, further comprising receiving the input optical signal diffracted in the first radiative mode in a direction aligned to the first radiative mode.

19. The method of claim 18, further comprising receiving the input optical signal diffracted in the second radiative mode in a direction aligned to the second radiative mode.

20. The method of claim 17, further comprising, setting the first intensity thereof as a default intensity.

21. The method of claim 17, further comprising, setting the second intensity thereof as a default intensity.

* * * * *